3,050,347
TRACTION DEVICE
Hans Leonard Levi, 300 Broadway, Dobbs Ferry, N.Y.
Filed Aug. 3, 1960, Ser. No. 47,236
7 Claims. (Cl. 305—20)

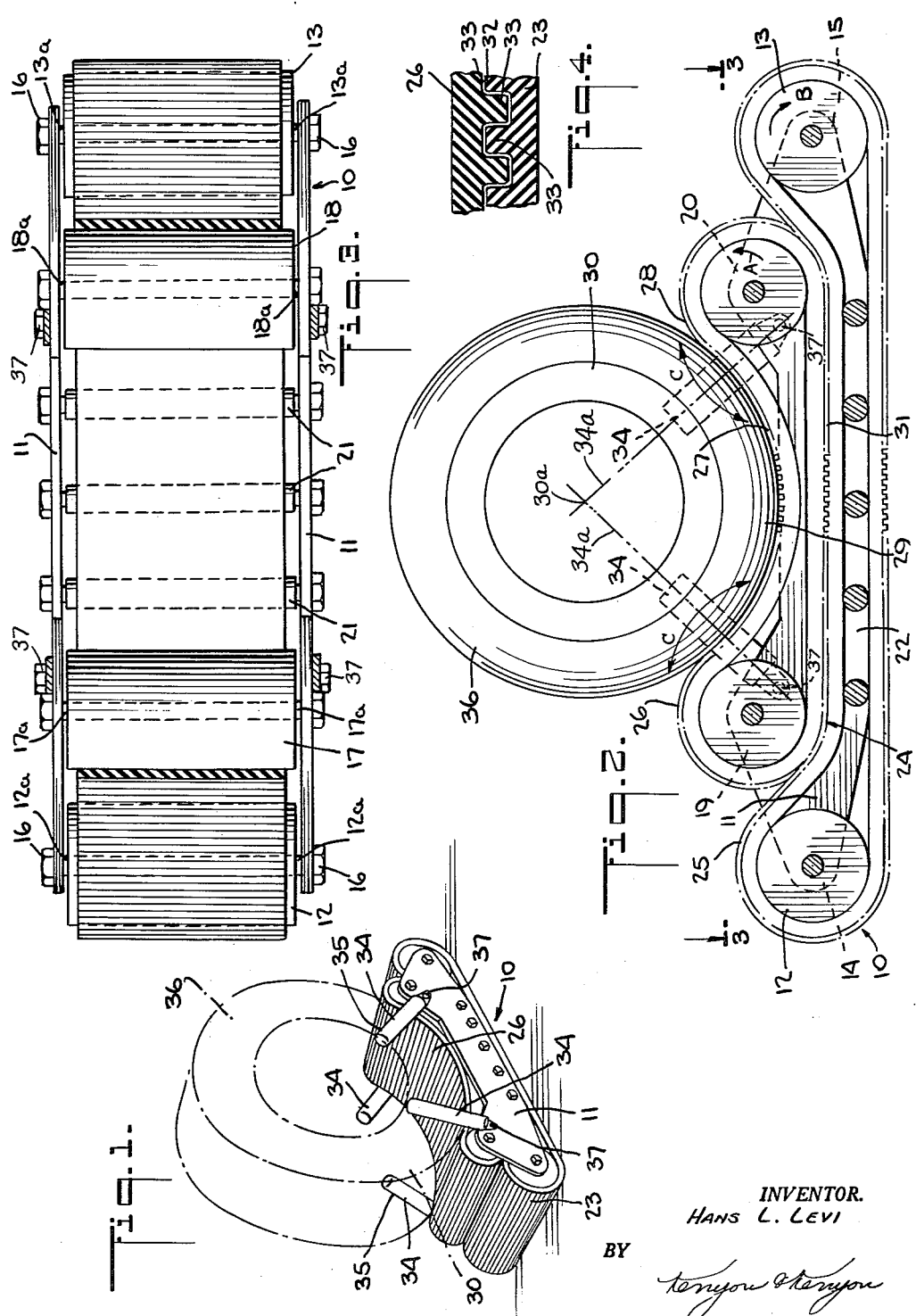

This invention relates to a device for use in connection with a driven automotive wheel to convert such wheel to a half track type propelling mechanism.

Numerous devices exist in the prior art which are adapted to be placed under the rear wheels of a car, truck or other automotive vehicle to increase the traction of the vehicle particularly in snow, ice, mud or sand. None of the prior art structures, however, has provided the desired features. For example, certain prior traction devices, in addition to utilizing rather elaborate structure, require that the vehicle engine be placed in reverse gear in order to achieve forward propulsion. See for example U.S. Patents 2,782,076 dated February 19, 1957, and 2,838,435 dated June 10, 1958. Consequently this requires use of a low gear when in fact for operation in, for example, ice, a high gear would be preferred for safer and more effective results.

In addition to the above mentioned defects, the prior art devices have generally not proven sufficiently rugged and simple in design to be economically feasible as well as operationally sufficient.

An object of the present invention is to provide a traction device for automotive vehicles which in addition to ruggedness of design and simplicity of structure permits utilization of the numerous forward gears of the engine to permit selection of various forward speeds.

Other objects and features of the invention will become apparent from the following description and claims, and in the drawings in which:

FIG. 1 is an isometric view of one embodiment of the invention showing the car wheel in phantom;

FIG. 2 is a side elevation of the device shown in FIG. 1;

FIG. 3 is a sectional plan view taken along lines 3—3 of FIG. 2; and

FIG. 4 is an enlarged fragmentary elevation of the intermeshed first and second tread members.

Referring now to the drawings, the traction device is shown in FIGS. 1–3 and designated generally by the reference numeral 10. In the embodiment shown the traction device is comprised of a pair of spaced elongated side plates 11 having a first pair of rollers 12, 13 journaled at their respective ends 12a, 13a, each at respective opposite lower ends 14, 15 of said side plates by any suitable means such as the threaded bolt members 16 as shown. A second pair of cylindrical rollers 17, 18 are similarly journaled at their respective ends 17a, 18a each at respective opposite upper ends 19, 20 of the side plates and are spaced longitudinally inwardly from said first pair of rollers as shown in FIG. 2. A plurality of smaller diameter idler or spacing rollers 21 are similarly journaled at their respective ends along the bottom edge 22 of said side plates between said first pair of rollers 12, 13. All of said rollers are aligned axially parallel with one another.

A first continuous flexible belt or tread member 23 is trained over said first pair of rollers 12, 13 and said idler rollers 21. Such tread member 23 has a dip, loop or bight 24 on its upper reach 25. A second continuous flexible tread member 26 is trained over the second pair of rollers 17, 18 and has a bight 27 on its upper reach 28 which is adapted to receive the lower part 29 of automobile driving wheel 30 (see FIGS. 1 and 2).

The upper reach 28 and lower reach 31 of second tread member 26 are spaced from one another throughout so that they do not come into frictional contact in operation. Although it is usually not necessary, spacing or idler rollers (not shown) may be utilized in conjunction with the second tread member, similar to those used in the present embodiment for the first tread member.

The outer surfaces 32, 33 of tread members 23, 26 have enhanced frictional characteristics provided by any suitable means such as the ribs or gear configurations 33 shown (see also FIG. 4), and the bottom reach 31 of second tread member 26 and upper reach 25 of first tread member 23 are frictional or intermeshing engagement whereby rotational movement of second tread member 26 imparts corresponding rotational movement of first tread member 23.

A plurality of retaining roller means 34 are provided on said side plates 11. Each of said means has a roller 35 thereon which will rotate in response to contact with the moving side wall 36 of car wheel 30 and retain the car wheel seated in driving engagement on the bight 27 of second tread member 26 and prevent lateral displacement of wheel 30 therefrom. Roller means 34 are each adjustably secured to side plates 11 by any convenient means such as bolts 37 and may be adjusted in the directions of arrows C so that their respective axes 34a are in line with the center 30a of car wheel 30 (see FIG. 2).

In operation the driving wheels, e.g. rear wheels, of a car or other automotive vehicle (not shown) are each driven onto or otherwise placed upon the upper or second tread member 26 of respective traction devices 10 by any suitable means such as a ramp, jack, or the like (none shown). Retaining roller means 34 are adjusted so that each is axially aligned with the center or axis of rotation of the car wheel and then their respective bolts 37 are tightened to maintain them in such orientation. Then by putting the car in any desired forward gear the rotation of the rear car wheels will move the upper tread member 26 in the direction of arrow A (see FIG. 2) and correspondingly the lower tread member 23 in the direction of arrow B to impart forward motion to the traction device, thereby propelling the vehicle in a forward direction or to the right as viewed in FIG. 2. Any of the forward gears of the vehicle may be utilized. Furthermore, should it be desired to move the vehicle in a reverse direction or to the left as viewed in FIG. 2 by placing the engine in reverse gear, reverse motion will be imparted through the traction device to the vehicle. The depth of bight 27 in upper tread 26 is sufficient to prevent the car wheels 30 from riding out therefrom during operation and the retaining rollers 34 prevent lateral displacement of the car wheels 30 from the device.

The rollers and side plates may be made of any suitable materials preferably metal and may be made of light weight metals for easier handling. The belts or tread members are preferably made of reenforced, highly abrasion resistant synthetic rubber but may be made of other suitable materials if desired. All rollers in the usual embodiment should be mounted on ball bearings (not shown). Although the first and second pairs of idlers are usually of equal diameter, it may be desirable in some circumstances to vary the relative diameters of said pairs to provide a gear ratio therebetween.

A traction device has thus been provided overcoming the defects of the prior art and providing a new and novel structure having enhanced utility and obvious economic advantages.

While one embodiment of the invention has been shown and described herein it is to be understood that certain changes and additions can be made by those skilled in the art without departing from the scope and spirit of the invention.

What is claimed is:
1. A traction device for an automotive driving wheel comprising a pair of spaced side plates, first and second pairs of rollers journaled at their respective ends to said side plates, said first pair of rollers disposed at opposite lower ends of said side plates, said second pair of rollers disposed at opposite upper ends of said side plates and spaced longitudinally inwardly from said first pair of rollers, and the bottom edges of said second pair of rollers lying below the plane of the top edges of said first pair of rollers, a first continuous flexible tread member trained over said first pair of rollers, a second continuous flexible tread member trained over said second pair of rollers, both tread members having upper and lower reaches intermediate their respective rollers, the lower reach of said second tread member and the upper reach of said first tread member being in frictional engagement whereby rotational movement of the upper tread member is transmitted to the lower tread member, the upper reach of said second tread member adapted to receive and contact an automotive driving wheel over a substantial portion of the bottom surface thereof, the depth of the latter said upper reach being sufficient to prevent longitudinal displacement of said driving wheel therefrom during use.

2. A traction device for an automotive driving wheel comprising a pair of spaced elongated side plates, first and second pairs of cylindrical rollers journaled at their respective ends to said side plates, said first pair of rollers disposed at opposite lower ends of said side plates, said second pair of rollers disposed at opposite upper ends of said side plates and spaced longitudinally inwardly from said first pair of rollers, and the bottom edges of said second pair of rollers lying below the plane of the top edges of said first pair of rollers, a first continuous flexible tread member trained over said first pair of rollers, a second continuous flexible tread member trained over said second pair of rollers, both tread members having upper and lower reaches intermediate their respective rollers, the bottom reach of said second tread member and the upper reach of said first tread member being in frictional engagement whereby rotational movement of the upper tread member is transmitted to the lower tread member, the upper reach of said second tread member adapted to receive and contact an automotive driving wheel over a substantial portion of the bottom surface thereof, the depth of the latter said upper reach being sufficient to prevent longitudinal displacement of said driving wheel therefrom during use, adjustable retaining means on said side plates adapted for engagement with said car wheel for preventing lateral displacement of said wheel.

3. A traction device for an automotive driving wheel comprising a pair of spaced elongated side plates, first and second pairs of cylindrical rollers journaled at their respective ends to said side plates, said first pair of rollers disposed at opposite lower ends of said side plates, said second pair of rollers disposed at opposite upper ends of said side plates and spaced longitudinally inwardly from said first pair of rollers, and the bottom edges of said second pair of rollers lying below the plane of the top edges of said first pair of rollers, a first continuous flexible tread member trained over said first pair of rollers, a second continuous flexible tread member trained over said second pair of rollers, both tread members having upper and lower reaches intermediate their respective rollers, the outer surfaces of each said tread members having enhanced frictional characteristics, the bottom reach of said second tread member and the upper reach of said first tread member being in frictional engagement whereby rotational movement of the upper tread member is transmitted to the lower tread member, the upper reach of said second tread member adapted to receive and contact an automotive driving wheel over a substantial portion of the bottom surface thereof, the depth of the latter said upper reach being sufficient to prevent longitudinal displacement of said driving wheel therefrom during use, adjustable retaining roller means on said side plates adapted for engagement with said car wheel for preventing lateral displacement of said wheel.

4. A traction device for an automotive driving wheel comprising a pair of spaced elongated side plates, first and second pairs of cylindrical rollers journaled at their respective ends to said side plates, said first pair of rollers disposed at opposite lower ends of said side plates, said second pair of rollers disposed at opposite upper ends of said side plates and spaced longitudinally inwardly from said first pair of rollers, and the bottom edges of said second pair of rollers lying below the plane of the top of said first pair of rollers, a first continuous flexible tread member trained over said first pair of rollers having an upper and a lower reach intermediate said rollers and a bight on its upper reach, a second continuous flexible tread member trained over said second pair of rollers having an upper and a lower reach intermediate said rollers and a bight on its upper reach adapted to receive the lower part of said automobile driving wheel and having a depth sufficient to prevent longitudinal displacement of said driving wheel therefrom during use, the outer surfaces of each said tread members having enhanced frictional characteristics, the bottom reach of said second tread member and the upper reach of said first tread member being in frictional engagement whereby rotational movement of the upper tread member is transmitted to the lower tread member, adjustable retaining roller means on said side plates adapted for engagement with said car wheel seated in driving engagement on said bight of said second tread member for preventing lateral displacement of said wheel therefrom.

5. A traction device for an automotive driving wheel comprising a pair of spaced elongated side plates, first and second pairs of cylindrical rollers journaled at their respective ends to said side plates, said first pair of rollers disposed at opposite lower ends of said side plates, said second pair of rollers disposed at oppoite upper ends of said side plates and spaced longitudinally inwardly from said first pair of rollers, and the bottom edges of said second pair of rollers lying below the place of the top edges of said first pair of rollers, a plurality of idler rollers journaled at their ends along said side plates between said first pair of rollers, all of said rollers aligned axially parallel with one another, a first continuous flexible tread member trained over said first pair of rollers and said idler rollers having an upper reach and a lower reach intermediate said first pair of rollers and having a bight on its upper reach, a second continuous flexible tread member trained over said second pair of rollers having an upper reach and a lower reach intermediate said second pair of rollers and having a bight on its upper reach adapted to receive the lower part of said automobile driving wheel and contact the same over a substantial portion of its bottom surface, the depth of said bight being sufficient to prevent longitudinal displacement of said driving wheel therefrom during use, the outer surfaces of each said tread members having enhanced frictional characteristics, the bottom reach of said second tread member and the upper reach of said first tread member being in frictional engagement whereby rotational movement of the upper tread member is transmitted to the lower tread member, adjustable retaining roller means on said side plates adapted for engagement with said car wheel seated in driving engagement on said bight of said second tread member for preventing lateral displacement of said wheel therefrom.

6. A traction device for an automotive driving wheel comprising a pair of spaced elongated side plates, first and second pairs of cylindrical rollers journaled at their respective ends to said side plates, said first pair of rollers disposed at opposite lower ends of said side plates, said second pair of rollers disposed at opposite upper ends of said side plates, and spaced longitudinally inwardly from said first pair of rollers and the bottom edges of said second pair of rollers lying below the plane of the top edges of said first pair of rollers, a plurality of smaller diameter idler rollers journaled at their ends along said side plates between said first pair of rollers, all of said rollers aligned axially parallel with one another, a first continuous flexible tread member trained over said first pair of rollers and said idler rollers having an upper reach and a lower reach intermediate said first pair of rollers and having a bight on its upper reach, a second continuous flexible tread member trained over said second pair of rollers having an upper reach and a lower reach intermediate said second pair of rollers and having a bight on its upper reach adapted to receive the lower part of said automobile driving wheel and contact the same over a substantial portion of its bottom surface, the depth of said bight being sufficient to prevent longitudinal displacement of said driving wheel therefrom during use, the upper and lower reaches of said second tread member being spaced from one another throughout, the outer surfaces of each said tread members having enhanced frictional characteristics, the bottom reach of said second tread member and the upper reach of said first tread member being in frictional engagement whereby rotational movement of the upper tread member is transmitted to the lower tread member, adjustable retaining roller means on said side plates adapted for engagement with said car wheel seated in driving engagement on said bight of said second tread member for preventing lateral displacement of said wheel therefrom.

7. A traction device for an automotive driving wheel comprising a pair of spaced elongated side plates, first and second pairs of cylindrical rollers journaled at their respective ends to said side plates, said first pair of rollers disposed at opposite lower ends of said side plates, said second pair of rollers disposed at opposite upper ends of said side plates and spaced longitudinally inwardly from said first pair of rollers and the bottom edges of said second pair of rollers lying below the plane of the top edges of said first pair of rollers, a plurality of smaller diameter cylindrical idler rollers journaled at their ends along the bottom edge of said side plates between said first pair of rollers, all of said rollers aligned axially parallel with one another, a first continuous flexible tread member trained over said first pair of rollers and said idler rollers having an upper reach and a lower reach intermediate said first pair of rollers and having a bight on its upper reach, a second continuous flexible tread member trained over said second pair of rollers having an upper reach and a lower reach intermediate said second pair of rollers and having a bight on its upper reach adapted to receive the lower part of said automobile driving wheel and contact the same over a substantial portion of its bottom surface, the depth of said bight being sufficient to prevent longitudinal displacement of said driving wheel therefrom during use, the upper and lower reaches of said second tread member being spaced from one another throughout, the outer surfaces of each said tread members having a geared configuration thereon, the bottom reach of said second tread member and the upper reach of said first tread member being in intermeshing engagement whereby rotational movement of the upper tread member is transmitted to the lower tread member, adjustable retaining roller means on said side plates adapted for engagement with car wheel seated in driving engagement on said bight of said second tread member for preventing lateral displacement of said wheel therefrom.

References Cited in the file of this patent

UNITED STATES PATENTS

| | | |
|---|---|---|
| 2,782,076 | Miller | Feb. 19, 1957 |
| 2,838,345 | Miller | June 10, 1958 |

FOREIGN PATENTS

| | | |
|---|---|---|
| 687,871 | France | May 5, 1930 |
| 241,807 | Switzerland | Aug. 1, 1946 |